US010462659B2

(12) United States Patent
Lee et al.

(10) Patent No.: US 10,462,659 B2
(45) Date of Patent: Oct. 29, 2019

(54) METHOD AND APPARATUS FOR PROXIMAL AUTHENTICATION OF WIRELESS ELECTRONIC DEVICE

(71) Applicant: Samsung Electronics Co., Ltd., Gyeonggi-do (KR)

(72) Inventors: Soo-Yong Lee, Gyeonggi-do (KR); Byung-Moo Lee, Seoul (KR); Joo-Yeol Lee, Gyeonggi-do (KR); Dong He, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 76 days.

(21) Appl. No.: 15/262,740

(22) Filed: Sep. 12, 2016

(65) Prior Publication Data

US 2017/0078881 A1 Mar. 16, 2017

(30) Foreign Application Priority Data

Sep. 11, 2015 (KR) .................... 10-2015-0129271

(51) Int. Cl.
| | | |
|---|---|---|
| *H04W 12/06* | (2009.01) | |
| *H04L 29/06* | (2006.01) | |
| *H04L 9/08* | (2006.01) | |
| *H04L 9/32* | (2006.01) | |
| *H04W 4/70* | (2018.01) | |
| *H04W 76/14* | (2018.01) | |

(52) U.S. Cl.
CPC ........... *H04W 12/06* (2013.01); *H04L 9/0872* (2013.01); *H04L 9/3215* (2013.01); *H04L 63/06* (2013.01); *H04L 63/08* (2013.01); *H04L 63/18* (2013.01); *H04L 2209/805* (2013.01); *H04W 4/70* (2018.02); *H04W 76/14* (2018.02)

(58) Field of Classification Search
CPC .. H04W 121/06; H04W 76/14; H04L 9/3215; H04L 9/0872; H04L 63/06; H04L 63/18; H04L 2209/805
USPC .......................................................... 726/6
See application file for complete search history.

(56) References Cited

U.S. PATENT DOCUMENTS

| | | | |
|---|---|---|---|
| 6,636,968 B1 * | 10/2003 | Rosner .................. | H04L 9/0833 713/178 |
| 7,421,074 B2 | 9/2008 | Jin et al. | |
| 9,954,684 B2 * | 4/2018 | Popa ..................... | H04L 9/3247 |
| 2011/0211700 A1 | 9/2011 | Park et al. | |
| 2013/0276063 A1 | 10/2013 | Hahm et al. | |
| 2015/0229473 A1 * | 8/2015 | Klein .................... | H04L 9/0841 713/171 |

(Continued)

FOREIGN PATENT DOCUMENTS

WO WO 2010053319 5/2010

*Primary Examiner* — Ashokkumar B Patel
*Assistant Examiner* — William B Jones
(74) *Attorney, Agent, or Firm* — The Farrell Law Firm, P.C.

(57) ABSTRACT

A method for communicating between devices is presented. The method includes dividing a first public key of a first device into at least two partial keys, transmitting the at least two partial keys through at least two communication channels having different physical characteristics, receiving a second public key of a second device through at least one of the at least two communication channels, authenticating the second device based on the received second public key, and performing secure communication with the second device using a public key generated based on the received second public key.

20 Claims, 6 Drawing Sheets

(56) References Cited

U.S. PATENT DOCUMENTS

2015/0271163 A1* 9/2015 Greenspan .............. H04L 63/08
713/168

* cited by examiner

METHOD AND APPARATUS FOR PROXIMAL AUTHENTICATION OF WIRELESS ELECTRONIC DEVICE

PRIORITY

This application claims priority under 35 U.S.C. § 119(a) to Korean Patent Application Serial No. 10-2015-0129271, which was filed in the Korean Intellectual Property Office on Sep. 11, 2015, the entire content of which is incorporated herein by reference.

BACKGROUND

1. Field of the Disclosure

The present disclosure generally relates to a method and apparatus for proximal authentication of a wireless electronic device.

2. Description of the Related Art

The Internet, which is a human-oriented connectivity network where humans generate and consume information, is now evolving to the Internet of things (IoT) where distributed entities exchange and process information. The Internet of everything (IoE) has also emerged, which is a combination of the IoT technology and big data processing technology through connection with a cloud server.

As technology elements, such as sensing technology, wired/wireless communication, network infrastructure, service interface technology, and security technology, have been demanded for IoT implementation, a sensor network, a machine to machine (M2M) network, machine type communication (MTC), and so forth have been recently researched for connection between things.

Such an IoT environment may provide intelligent Internet technology (IT) services that create new value to human life by collecting and analyzing data generated among connected things. IoT may be applied to a variety of fields including smart home, smart building, smart city, smart car or connected car, smart grid, health care, smart appliances, advanced medical services, and so forth through convergence and combination between existing IT and various industries.

Electronic devices that provide various services using M2M or IoT technologies for sharing information by configuring a communication network between objects and devices have been developed. Such information sharing technologies enable communication between an object and an object, as well as between a human and a human and between a human and an object, making it possible to provide new additional value services by sharing information among all objects.

One of the techniques needed for communication between objects is mutual authentication for secure communication between the objects. Existing authentication techniques use, for example, a near field communication (NFC) or quick response (QR) code, in which users bring their devices into contact with counterpart devices by physical actions to obtain a public key for secure communication.

However, the above-described conventional techniques need the users' physical actions of bringing their devices into contact with the counterpart devices and obtain a public key merely through one channel, hindering strong security.

SUMMARY

An aspect of the present disclosure provides a method and apparatus for achieving authentication between devices through minimizing a user's physical approach and action.

Another aspect of the present disclosure provides a method and apparatus for supporting reinforced security for proximal authentication of an electronic device.

Another aspect of the present disclosure provides a safe authentication technique for easy setup between devices.

According to an aspect of the present disclosure, there is provided a method for communicating between devices. The method includes dividing a first public key of a first device into at least two partial keys, transmitting the at least two partial keys through at least two communication channels having different physical characteristics, respectively, receiving a second public key of a second device through at least one of the at least two communication channels, authenticating the second device based on the received second public key, and performing secure communication with the second device by using a public key generated based on the received second public key.

According to another aspect of the present disclosure, there is provided a method for communicating between devices. The method includes executing an application for authenticating a first device on a second device, receiving at least two partial keys generated from a first public key of the first device through at least two communication channels having different physical characteristics from the first device, respectively, during execution of the application, generating a second public key of the second device based on the at least two partial keys, transmitting the second public key through at least one of the at least two communication channels, and performing secure communication with the first device by using a public key generated based on the received first public key.

According to another aspect of the present disclosure, there is provided an electronic device supporting communication between devices. The electronic device includes a transceiver configured to establish at least two communication channels having different physical characteristics and a controller configured to divide a first public key of a first device into at least two partial keys, to transmit the at least two partial keys through at least two communication channels having different physical characteristics, respectively, to receive a second public key of a second device through at least one of the at least two communication channels, to authenticate the second device based on the received second public key, and to perform security communication with the second device by using a public key generated based on the received second public key.

According to another aspect of the present disclosure, there is provided an electronic device supporting communication between devices. The electronic device includes a transceiver configured to establish at least two communication channels having different physical characteristics and a controller configured to execute an application for authentication of a counterpart device during execution of the application, to receive at least two partial keys generated from a first public key of the counterpart device through the at least two communication channels, respectively, to generate a second public key of the electronic device based on the at least two partial keys, to transmit the second public key through at least one of the at least two communication channels, and to perform secure communication with the counterpart device by using a shared key generated based on the received first public key.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
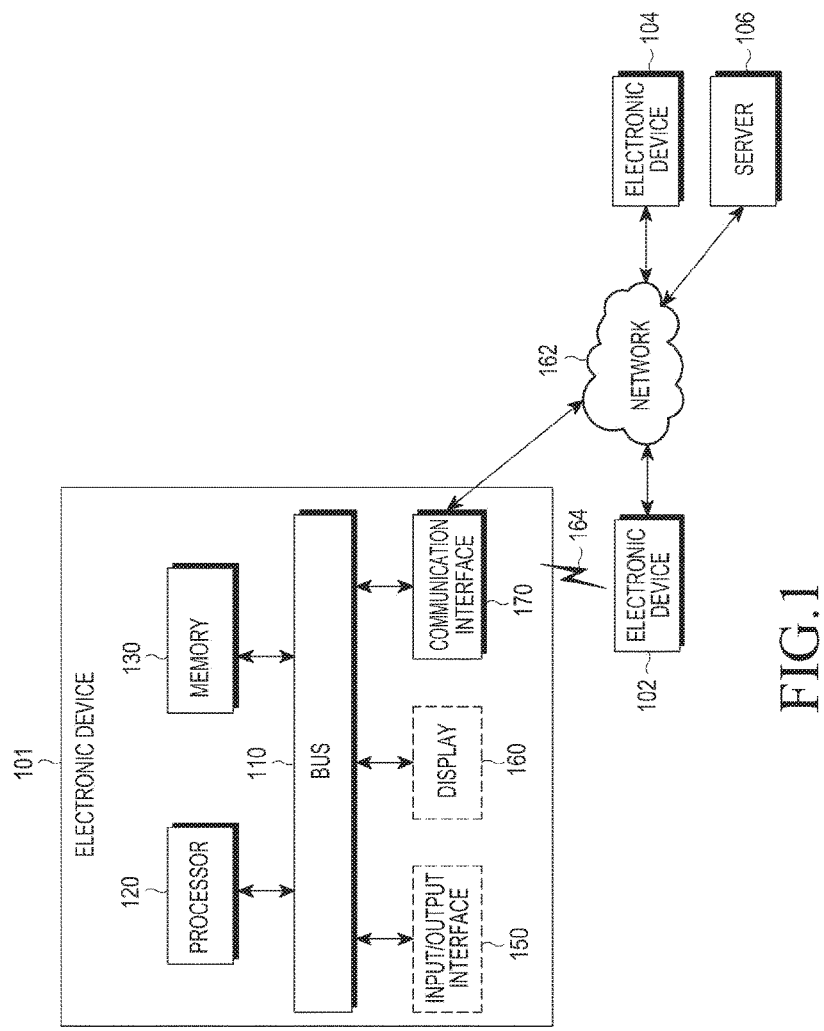
FIG. 1 illustrates a network environment, according to various embodiments of the present disclosure.

Hereinafter, various embodiments of the present disclosure will be disclosed with reference to the accompanying drawings.

When embodiments of the present disclosure are described, technical matters that are well known in a technical field of the present disclosure and are not directly related to the present disclosure will not be described. By omitting an unnecessary description, the subject matter of the present disclosure will be more clearly described.

Some elements may be exaggerated, omitted, or simplified in the attached drawings. The size of each element does not entirely reflect the actual size of the element. In each drawing, an identical or corresponding element will be referred to as an identical reference numeral.

Advantages and features of the present disclosure and a method for achieving them will be apparent with reference to embodiments described below together with the attached drawings. However, the present disclosure is not limited to the disclosed embodiments, which may be implemented in various manners, and the embodiments are provided to complete the disclosure of the present disclosure and to allow those of ordinary skill in the art to understand the scope of the present disclosure. The present disclosure is defined by the appended claims and their equivalents. Throughout the specification, an identical reference numeral will indicate an identical element.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented the computer or the processor of the programmable data processing device produce a means for performing functions specified in the flowchart and/or block diagram block or blocks. These computer program instructions may also be stored in a non-transitory computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of order. For example, two blocks shown in succession may, in fact, be executed substantially concurrently or the blocks may be executed in the reverse order, depending on the functionality involved.

The term "unit" as used herein refers to software or a hardware element such as a field-programmable gate array (FPGA), an application specific integrated circuit (ASIC), etc., and "unit" plays specific roles. However, the meaning of the term "unit" is not limited to software or hardware. A "unit" may advantageously be configured to reside in the addressable storage medium and be configured to reproduce the functionality of one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". In addition, components and "unit(s)" may be implemented to execute one or more CPUs in a device or a secure multimedia card.

While a description will be focused on an OFDM-based wireless communication system when embodiments of the present disclosure are described in detail, the main subject matter to be claimed in the specification is also applicable to other communication systems and services having a similar technical background without significantly departing from a range disclosed herein, as will be obvious to those of ordinary skill in the art.

FIG. 1 illustrates a network environment, according to various embodiments of the present disclosure.

Referring to FIG. 1, an electronic device 101 includes a bus 110, a processor 120 (may be act as a controller), a memory 130, an input/output (I/O) interface 150, a display 160 and a communication interface 170. According to an embodiment of the present disclosure, the electronic device 101 may not include at least one (e.g., the I/O interface 150 and/or the display 160) of the foregoing elements or may further include other elements (e.g., a camera module, an electronic sensor, etc.).

The bus 110 may include a circuit for connecting the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an embodiment of the present disclosure, the memory 130 may store software and/or a program. The program 140 may include at least one of, for example, a kernel, middleware, an application programming interface (API), and/or an application program (or "application" or App), and the like. At least some of the kernel, the middleware, and the API may be referred to as an operating system (OS).

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various content (e.g., a text, an image, video, an icon, a symbol, etc.) to users. The display 160 may include a touch screen, and receive a touch, a gesture, proximity, or a hovering input, for example, by using an electronic pen or a part of a body of a user.

The communication interface 170 establishes communication between the electronic device 101 and an external device such as a first electronic device 102, a second electronic device 104, or a server 106. For example, the communication interface 170 may be connected to a network 162 through wireless communication or wired communication to communicate with the second electronic device 104 or the server 106. In particular, the communication interface 170 may include two or more communication modules having different physical characteristics, e.g., an ultra-short-range communication module or a short-range communication module.

Wireless communication may use, for example, as a cellular communication protocol, at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. The wireless communication may include, for example, short-range communication 164. The short-range communication 164 may include, for example, at least one of wireless fidelity (WiFi), Bluetooth (BT), Bluetooth low energy (BLE), near field communication (NFC), Zigbee, z-wave, a global navigation satellite system (GNSS), and the like. Depending on a usage area or bandwidth, the GNSS may include, for example, at least one of a global positioning system (GPS), a global navigation satellite system (Glonass), a Beidou navigation satellite system (Beidou), and Galileo, the European global satellite-based navigation system. As used herein, the term "GPS" may be used interchangeably with "GNSS". The wired communication may include, for example, at least one of a USB (universal serial bus), a high definition multimedia interface (HDMI), a recommended standard (RS)-232, a plain old telephone service (POTS), and so forth. The network 162 may include a telecommunications network, for example, at least one of a cellular communication network, a computer network (e.g., a local area network (LAN) or a wide area network (WAN)), Internet, and a telephone network.

Each of the first electronic device 102 and the second electronic device 104 may be a device of the same type as, or a different type than, the electronic device 101. According to an embodiment of the present disclosure, the server 106 may include a group of one or more servers. Some or all of operations performed by the electronic device 101 may be performed in another electronic device or a plurality of electronic devices (e.g., the electronic device 102 or 104, or the server 106). When the electronic device 101 has to perform a function or a service automatically or at a request, the electronic device 101 may request the electronic devices 102 or 104 or the server 106 to perform at least some functions associated with the function or the service instead of or in addition to executing the function or the service. The electronic device 102 or 104 or the server 106 may execute the requested function or additional function and deliver the execution result to the electronic device 101. The electronic device 101 may then process or further process the received result to provide the requested function or service. To this end, for example, cloud computing, distributed computing, or client-server computing may be used.

Hereinafter, an electronic device according to various embodiments of the present disclosure will be described with reference to the attached drawings.

Figure 2:
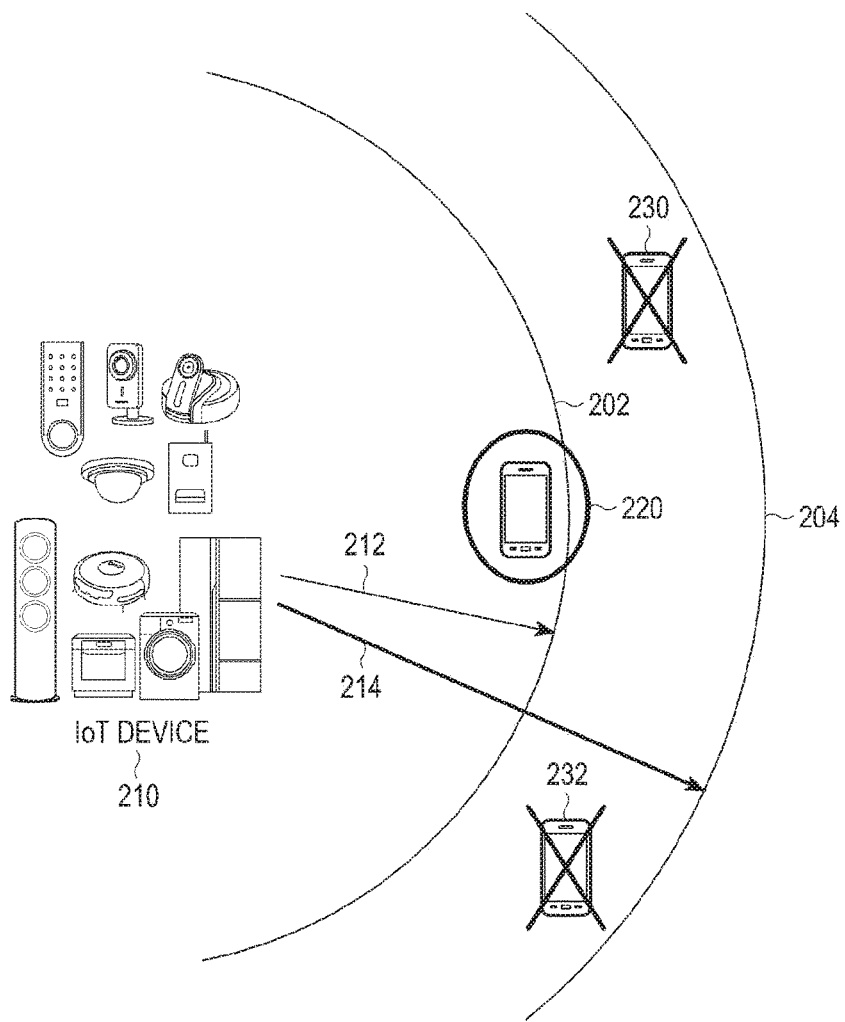
FIG. 2 illustrates a network environment including devices within a short distance, according to an embodiment of the present disclosure.

FIG. 2 illustrates a network environment including devices within a short distance, according to an embodiment of the present disclosure.

Referring to FIG. 2, in an illustrated example assuming a home network environment, an electronic device 210 supporting IoT may be a television (TV), a refrigerator, an air conditioner, a microwave oven, a printer, an illumination device, a security device, and the like. The electronic device 210 is configured to perform communication by establishing at least two first and second communication channels 212 and 214 having different physical characteristics. For example, the communication channels 212 and 214 may have different operating ranges and/or different capacities. In the illustrated example, a range 202 of the first communication channel 212 is shorter than a range 204 of the second communication channel 214. Examples of the first communication channel 212 may include BLE, ultrasonic waves, visible light communication, infrared communication, and so forth. Examples of the second communication channel 214 may include WiFi, Bluetooth, and so forth.

The electronic device 210 desires to communicate with another electronic device 220. Herein, the electronic device 220 may operate as a configurator for configuring the electronic device 210, and may be, for example, a smartphone, a control console, and the like. When the electronic device 220 operates as the configurator, the electronic device 210 may be configured by the electronic device 220 for easy setup of connection with an access point (AP) of a cellular communication network. To this end, it is necessary to authenticate the connection between the electronic device 210 and the electronic device 220.

The electronic device 210 divides a unique identifier (ID) (or a public key or a certificate) and transmits partial IDs to the electronic device 220 through at least two communication channels, i.e., the first communication channel 212 and the second communication channel 214 in FIG. 2. To this end, the electronic device 210 and the electronic device 220 are configured to connect two or more communication channels. The electronic device 220 within the range 202 of the first communication channel 212 having an ultra-shortdistance feature of the electronic device 210 receives at least one partial ID transmitted by the electronic device 210 through the first communication channel 212. Other electronic devices 230 and 232 which are out of the range 202 of the first communication channel 212 may not detect the partial IDs, such that even if receiving the partial IDs transmitted by the electronic device 210 through the second communication channel 214, the electronic devices 230 and 232 may not authenticate the electronic device 210.

The unique ID may include a unique ID stored in the electronic device 210 or a public key or a certificate that may be generated based on the ID. The unique ID means a secure ID that characterizes uniqueness of the electronic device 210, and each electronic device is uniquely identified by its unique ID.

The electronic device 220 receives all partial IDs transmitted from the electronic device 210 through the first communication channel 212 and the second communication channel 214 to authenticate the electronic device 210.

Figure 3:
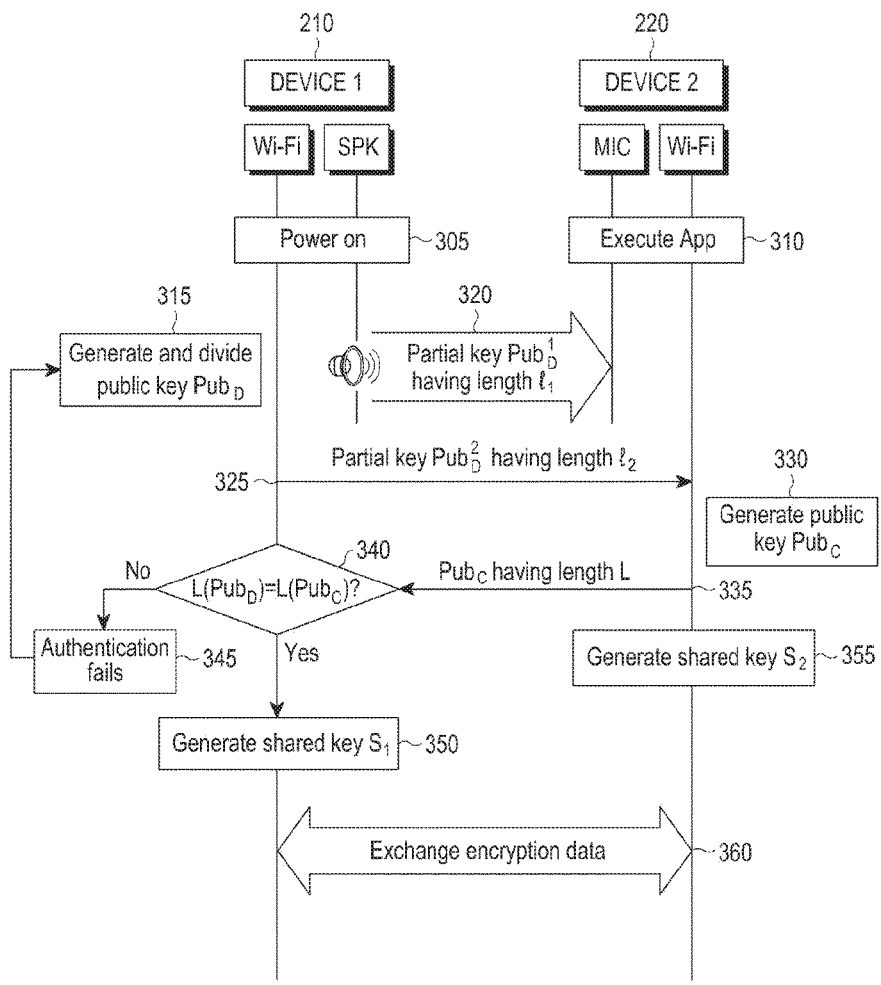
FIG. 3 illustrates a message flow for an authentication procedure between electronic devices, according to an embodiment of the present disclosure.

FIG. 3 illustrates a message flow for an authentication procedure between electronic devices according to an embodiment of the present disclosure. Although FIG. 3 illustrates an example in which the electronic devices 210 and 220 use an ultrasonic communication channel and a WiFi channel through a speaker and a microphone, other various embodiments are also possible in which a BLE communication channel and a WiFi channel are used or the BLE communication channel and a BT channel are used.

Referring to FIG. 3, once the electronic device 210 is powered on in step 305, the electronic device 210 generates a public key $Pub_D$ for secure communication with the electronic device 220 based on a previously stored unique ID. In an embodiment of the present disclosure, the public key $Pub_D$ may include a value of the unique ID or a public key generated based on the unique ID or a self-signatured certificate. The electronic device 210 divides the public key $Pub_D$ into at least two partial key $Pub_D^i$ (i is an integer greater than or equal to 2). When the electronic device 210 uses its unique ID as the public key $Pub_D$, the partial keys may be partial IDs.

The electronic device 210 generates as many partial keys as the number of communication channels having different physical characteristics (e.g., operating ranges), which may be connected between the electronic device 210 and the electronic device 220. N partial keys that are more than the communication channels may be generated.

The length of each partial key may be determined according to a capacity of at least one of the communication channels. The electronic device 210 arbitrarily determines a length $l_1$ greater than or equal to the maximum number of bytes (e.g., 4 bytes) that may be transmitted through an ultrasonic communication channel having a smaller capacity than the WiFi channel, and determines some bits of the public key $Pub_D$ as the first partial key. For example, the first partial key may be $l_1$ least significant bits (LSBs) or $l_1$ most significant bits (MSBs) of the public key Pubic. The other bits of the public key $Pub_D$ may be the second partial key having a length $l_2$. ($l_1+l_2=L$, and L indicates a length of $Pub_D$). For transmission through the WiFi channel, the length $l_2$ may be a maximum of 232 bytes.

The electronic device 210 transmits the first partial key through the ultrasonic communication channel in step 320 and transmits the second partial key through the WiFi channel in step 325. In another embodiment of the present disclosure, three partial keys are generated, and the electronic device 210 transmits the first partial key through the ultrasonic communication channel, the second partial key through the WiFi channel, and the third partial key through the ultrasonic communication channel or the WiFi channel. When more partial keys are generated, various combinations of partial keys and communication channels are possible.

In step 310, the electronic device 220 needs to execute a preset application for authenticating the electronic device 210 to receive partial keys from the electronic device 210. The application may be programmed to detect the partial keys transmitted from the electronic device 210 and to perform the following operations in response to the partial keys. During execution of the application, the electronic device 220 receives the partial keys transmitted from the electronic device 210 through the ultrasonic communication channel and the WiFi channel in step 320 and step 325.

In step 330, the electronic device 220 having received all the partial keys transmitted from the electronic device 210 generates the public key $Pub_D$ by conjugating the partial keys, and generates its public key $Pub_C$ having the same length L as the public key $Pub_D$. In step 335, the electronic device 220 transmits the public key $Pub_C$ to the electronic device 210. To transmit the public key $Pub_C$, the WiFi channel having the larger capacity may be used.

In step 340, the electronic device 210 compares the length L ($Pub_D$) of the public key $Pub_D$ generated in step 315 with the length L ($Pub_C$) of the received public key $Pub_C$ to authenticate communication with the electronic device 220. In another embodiment of the present disclosure, for authentication, the electronic device 210 compares the public key $Pub_D$ with the public key $Pub_C$. If the lengths L are not equal to each other, the electronic device 210 determines that the electronic device 210 fails the authentication procedure in step 345 and returns to step 315 or terminates the operation. On the other hand, if the lengths L are equal to each other, the electronic device 210 determines that the electronic device 210 succeeds in authentication in step 350 and generates a shared key $S_1$ based on the public key $Pub_C$ and/or $Pub_D$. In the same manner, the electronic device 220 generates the shared key S2 based on the public key $Pub_C$ and/or $Pub_D$ in step 355.

In step 360, the electronic device 210 and the electronic device 220 exchange encrypted data based on the shared keys $S_1$ and $S_2$.

Figure 4:
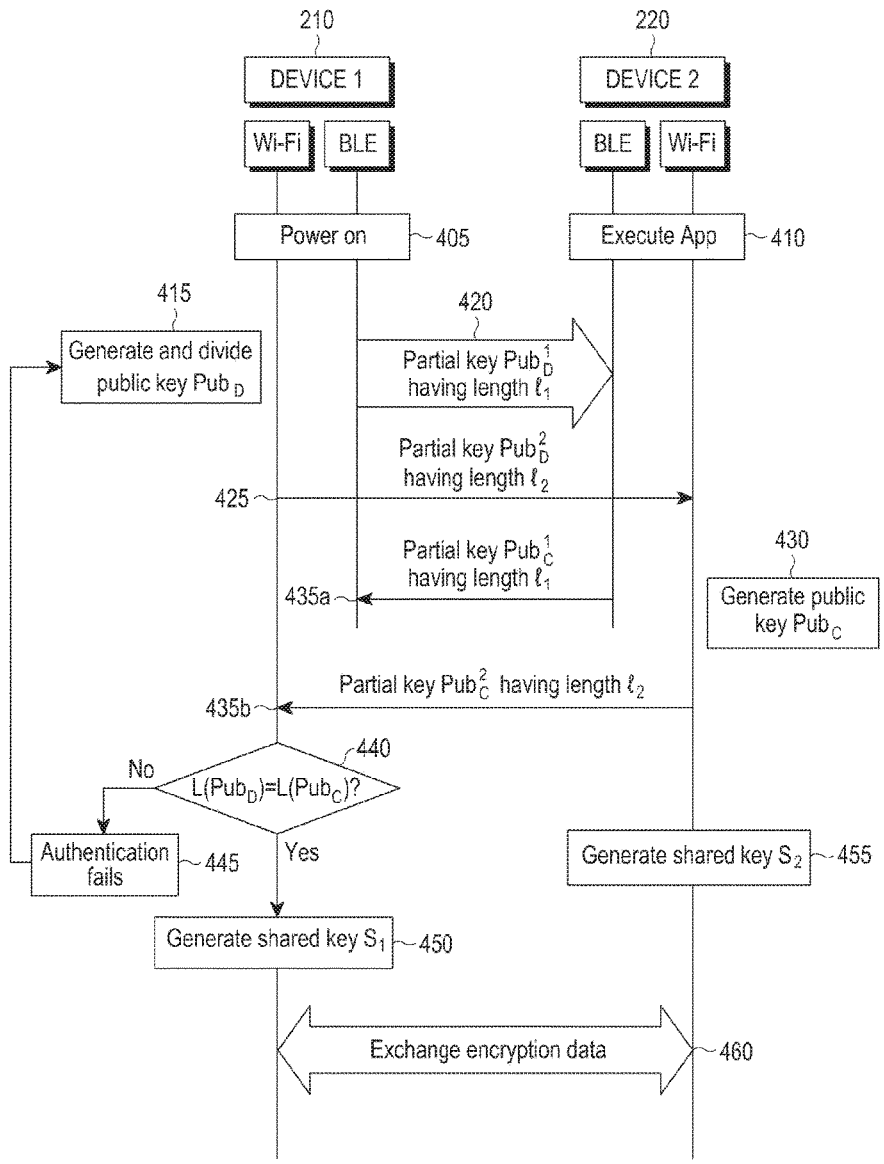
FIG. 4 illustrates a message flow for an authentication procedure between electronic devices, according to another embodiment of the present disclosure.

FIG. 4 illustrates a message flow for an authentication procedure between electronic devices, according to an embodiment of the present disclosure. In FIG. 4, the electronic devices 210 and 220 use the BLE channel and the WiFi channel.

Referring to FIG. 4, once the electronic device 210 is powered on in step 405, the electronic device 210 generates a public key $Pub_D$ for secure communication with the electronic device 220 based on a previously stored unique ID. In an embodiment of the present disclosure, the public key $Pub_D$ may include a value of the unique ID or a public key generated based on the unique ID or a self-signatured certificate. The electronic device 210 divides the public key $Pub_D$ into at least two partial keys Pug (i is an integer greater than or equal to 2).

The electronic device 210 generates as many partial keys as the number of communication channels having different physical characteristics (e.g., operating ranges), which may be connected between the electronic device 210 and the electronic device 220. N partial keys, that are more than the communication channels, may be generated.

The length of each partial key may be determined according to a capacity of at least one of the communication channels. For example, the electronic device 210 arbitrarily determines a length $l_1$ less than or equal to maximum bytes (e.g., 24 bytes) that may be transmitted through a BLE channel having a smaller capacity than the WiFi channel, and determines some bits of the public key $Pub_D$ as the first partial key. The other bits of the public key $Pub_D$ may be the second partial key (or second through $N^{th}$ partial keys) having a length $l_2$ ($l_1+l_2=L$ and L indicates the length of $Pub_D^2$).

The electronic device 210 transmits the first partial key $Pub_D^1$ through the BLE channel in step 420 and transmits the second partial key Pug through the WiFi channel in step 325. In another embodiment of the present disclosure, three partial keys are generated, and the electronic device 210 transmits the first partial key through the BLE channel, the second partial key through the WiFi channel, and the third partial key through the BLE channel or the WiFi channel. When more partial keys are generated, various combinations of partial keys and communication channels are possible.

In step 410, the electronic device 220 executes a preset application for authenticating the electronic device 210 to receive partial keys from the electronic device 210. During execution of the application, the electronic device 220 receives the partial keys transmitted from the electronic device 210 through the BLE channel and the WiFi channel in step 420 and step 425.

In step 430, the electronic device 220 having received all the partial keys transmitted from the electronic device 210 generates the public key $Pub_D$ by conjugating the partial keys, generates its public key $Pub_C$ having the same length L as the public key $Pub_D$, and divides the public key $Pub_C$ in the same manner as in $Pub_D^1$ and $Pub_D^2$. In the illustrated example, the electronic device 220 generates, from the public key $Pub_C$, partial keys $Pub_C^1$ and $Pub_C^2$ having lengths that are equal to the lengths $l_1$ and $l_2$ of the partial keys received in steps 420 and 425. For example, the electronic device 220 may determine $l_1$ LSBs or $l_1$ MSBs of the public key $Pub_C$ as the first partial key $Pub_C^1$. The other bits of the public key $Pub_C$ may be the second partial key $Pub_C^2$ having a length $l_2$ ($l_1+l_2=L$ and L indicates the length of $Pub_C$).

In steps 435a and 435b, the electronic device 220 transmits the partial keys $Pub_C^1$ and $Pub_C^2$ through the BLE channel and the WiFi channel respectively. More specifically, the $l_1$-bit partial key $Pub_C^1$ is transmitted through the BLE channel and the $l_2$-bit partial key $Pub_C^2$ is transmitted through the WiFi channel.

In step 440, the electronic device 210 compares the length L ($Pub_D$) of the public key $Pub_D$ generated in step 415 with the length L ($Pub_C$) of the public key $Pub_C$ received in steps 435a and 435b to authenticate communication with the electronic device 220. In another embodiment of the present disclosure, for authentication, the electronic device 210 compares the public key $Pub_D$ with the public key $Pub_C$ generated by combining the received partial keys. If the lengths L are not equal to each other, the electronic device 210 determines that the electronic device 210 fails in authentication in step 445 and returns to step 415 or terminates the operation. On the other hand, if the lengths L are equal to each other, the electronic device 210 determines that the electronic device 210 succeeds in authentication in step 450 and generates a shared key $S_1$ based on the public key $Pub_C$ and/or $Pub_D$. In the same manner, the electronic device 220 generates the shared key $S_2$ based on the public key $Pub_C$ and/or $Pub_D$ in step 455.

In step 460, the electronic device 210 and the electronic device 220 exchange encryption data based on the shared keys $S_1$ and $S_2$.

Figure 5:
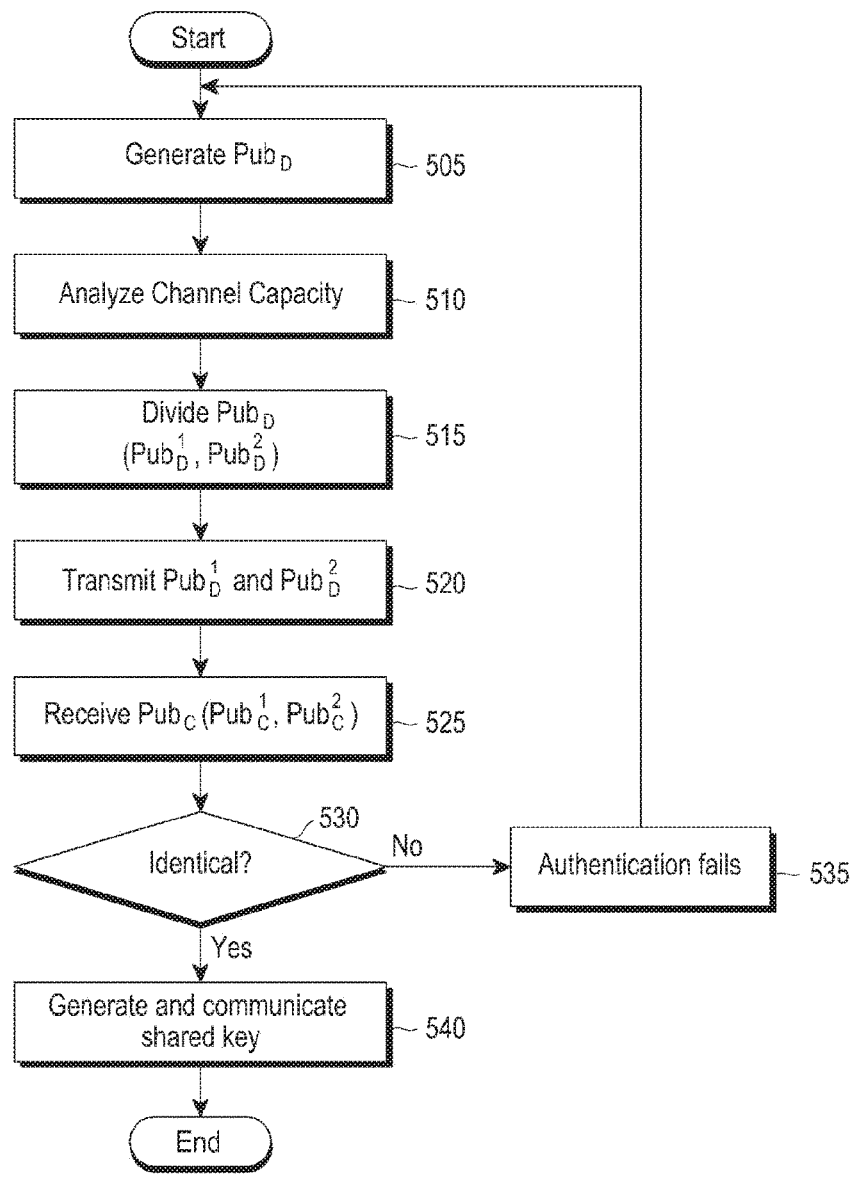
FIG. 5 is a flowchart illustrating a procedure for transmitting partial keys in an electronic device, according to an embodiment of the present disclosure.

FIG. 5 is a flowchart illustrating a procedure for transmitting partial keys in an electronic device, according to an embodiment of the present disclosure.

Referring to FIG. 5, the electronic device generates a public key $Pub_D$ for secure communication with the counterpart device based on its unique ID. In step 510, the electronic device analyzes the capacities of communication channels that are connectable between the electronic device and the counterpart device and divides the public key $Pub_D$ into at least two partial keys $Pub_D^i$ (i indicates an integer greater than or equal to 2) based on a length of data that may be transmitted through a communication channel having the smallest capacity. Herein, the electronic device generates two partial keys $Pub_D^1$ and $Pub_D^2$ for two communication channels.

In step 520, the electronic device transmits the partial keys $Pub_D^1$ and $Pub_D^2$ through the first and second communication channels. In step 525, the electronic device receives the public key $Pub_C$ transmitted from the counterpart device through at least one of the first communication channel and the second communication channel or receives the two partial keys $Pub_C^1$ and $Pub_C^2$ through the first communication channel and the second communication channel. In step 530, the electronic device determines whether the public key obtained from the counterpart device is identical to the public key generated in step 505. To this end, for example, the electronic device may compare the length of the received public key $Pub_C$ or a sum of the lengths of the received partial keys $Pub_C^1$ and $Pub_C^2$ with the length of the public key $Pub_D$. If the lengths L are not equal to each other, the electronic device 210 determines that the electronic device 210 fails the authentication procedure in step 535 and returns to step 505 or terminates the operation. On the other hand, if the lengths L are equal to each other, the electronic device 210 determines that the electronic device 210 succeeds in authentication in step 540 and generates a shared key based on the public key $Pub_C$ and/or $Pub_D$. In step 540, the electronic device communicates with the counterpart device based on the shared key.

Figure 6:
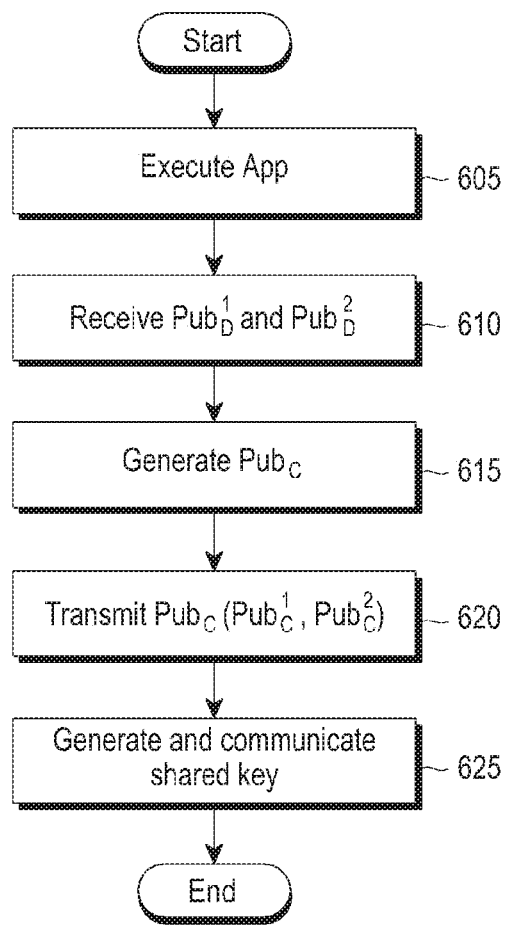
FIG. 6 is a flowchart illustrating a procedure for receiving partial keys in an electronic device, according to an embodiment of the present disclosure.

FIG. 6 is a flowchart illustrating a procedure for receiving partial keys in an electronic device, according to an embodiment of the present disclosure.

Referring to FIG. 6, the electronic device executes a preset application for authenticating the counterpart device to receive partial keys from the counterpart device in step 605. During execution of the application, the electronic device receives at least two partial keys transmitted from the counterpart device through at least two communication channels in step 610.

In step 615, the electronic device 220 having received all the partial keys transmitted from the counterpart device generates the public key $Pub_D$ by conjugating the partial keys, and generates its public key $Pub_C$ having the same length L as the public key $Pub_D$. In step 620, the electronic device 220 transmits the generated public key $Pub_C$ through one communication channel or the partial keys $Pub_C^1$ and $Pub_C^2$ generated from the public key $Pub_C$ through the at least two communication channels. Each partial key is transmitted at least once through at least one communication channel.

In step 625, the electronic device generates a shared key based on the public key $Pub_C$ and/or $Pub_D$ and communicates with the counterpart device based on the shared key.

According to an embodiment of the present disclosure operating as described above, only a device which has both an ultra-short-range communication module and a short-range communication module and is capable of receiving and combining partial security information among other electronic devices located within an ultra-short-range communication range of an IoT device may respond to transmission of the partial security information, thereby improving a security level of authentication and blocking message hijacking and brute force attack from an attacker.

An embodiment of the present disclosure may also be implemented as a computer readable code in a computer readable recording medium in particular aspects. The computer readable recording medium may be any type of data storage device that may store data readable by a computer system. Examples of recording-mediums readable by the computer may include a read-only memory (ROM), a random-access memory (RAM), a compact disc-read only memory (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random access memory (RAM), a memory chip, a device, or an integrated circuit, and an optically or magnetically recordable and machine (e.g., computer)-readable storage medium such as a compact disc (CD), a digital versatile disk (DVD), a magnetic disk, or a magnetic tape. It may be seen that the method may be implemented by a computer or a portable terminal which includes a controller and a memory, and the memory is an example of a machine-readable storage medium which is suitable for storing a program or programs including instructions for implementing the embodiment of the present disclosure.

Accordingly, the present disclosure includes a program that includes a code for implementing the apparatus and method set forth in the appended claims of the specification and a machine (computer, etc.) readable storage medium for storing the program. The program may be electronically transferred through an arbitrary medium such as a communication signal delivered through a wired or wireless connection, and the present disclosure properly includes equivalents thereof.

The apparatus, according to an embodiment of the present disclosure, may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

The embodiments disclosed in the present specification and drawings have been provided to describe the present disclosure and to help understanding of the present disclosure, and do not limit the scope of the present disclosure. While the foregoing embodiments of the present disclosure have been shown and described as examples, it will be apparent to those of ordinary skill in the art that modifications and variations may be made without departing from the spirit and scope of the embodiments as defined by the appended claims and their equivalents. Therefore, the true technical scope of the present disclosure is defined by the appended claims and their equivalents.

What is claimed is:

1. A method for communicating between devices, the method comprising:
dividing a first public key of a first device into at least two partial keys;
transmitting the at least two partial keys divided from the first public key through at least two communication channels having different physical characteristics;
receiving, from a second device, at least two partial keys divided from a second public key through at least one of the at least two communication channels;
determining whether lengths of the at least two partial keys divided from the first public key and lengths of the at least two partial keys divided from a second public key are equal to each other; and
in response to lengths of the at least two partial keys divided from the first public key and lengths of the at least two partial keys divided from a second public key being equal to each other, performing secure communication with the second device using a public key generated based on the at least two partial keys divided from the second public key.

2. The method of claim 1, wherein the at least two communication channels comprise a first communication channel and a second communication channel having different operating ranges.

3. The method of claim 2, wherein the first communication channel uses at least one of a BLUETOOTH low energy (BLE), ultrasonic communication, visible light communication, and infrared communication; and
the second communication channel uses at least one of wireless fidelity (WiFi) and BLUETOOTH (BT).

4. The method of claim 1, wherein dividing the first public key comprises determining the lengths of the at least two partial keys based on capacities of the at least two communication channels, and generating the at least two partial keys using bits of the determined lengths.

5. The method of claim 1, wherein the second device is configured to transmit the at least two partial keys divided from the second public key in response to the at least two partial keys transmitted from the first device.

6. A method for communicating between devices, the method comprising:
executing an application for authenticating a first device on a second device;
receiving, from the first device, at least two partial keys divided from a first public key of the first device through at least two communication channels having different physical characteristics;
generating a second public key of the second device based on the at least two partial keys divided from the first public key;
transmitting, to the first device, at least two partial keys divided from the second public key through at least one of the at least two communication channels; and
performing secure communication with the first device using a public key generated based on the at least two partial keys divided from the first public key, wherein the at least two partial keys divided from the second public key comprise lengths that are equal to lengths of the at least two partial keys divided from the first public key.

7. The method of claim 6, wherein the at least two communication channels comprise a first communication channel and a second communication channel having different operating ranges.

8. The method of claim 7, wherein the first communication channel uses at least one of a BLUETOOTH low energy (BLE), ultrasonic communication, visible light communication, and infrared communication; and the second communication channel uses at least one of wireless fidelity (WiFi) and BLUETOOTH (BT).

9. The method of claim 6, wherein at least one of the at least two partial keys divided from the first public key has a length determined based on capacities of the at least two communication channels, and comprises some bits of the first public key.

10. The method of claim 6, wherein the application is executed to transmit, by the second device, the second public key in response to the at least two partial keys received from the first device.

11. An electronic device supporting communication between devices, the electronic device comprising:
a transceiver configured to establish at least two communication channels having different physical characteristics; and
a controller configured to divide a first public key of a first device into at least two partial keys, to transmit the at least two partial keys divided from the first public key through the at least two communication channels having different physical characteristics, to receive, from a second device, at least two partial keys divided from a second public key through at least one of the at least two communication channels, to determine whether lengths of the at least two partial keys divided from the first public key and lengths of the at least two partial keys divided from a second public key are equal to each other, and in response to lengths of the at least two partial keys divided from the first public key and lengths of the at least two partial keys divided from a second public key being equal to each other, to perform secure communication with the second device using a public key generated based on the at least two partial keys divided from the received second public key.

12. The electronic device of claim 11, wherein the at least two communication channels comprise a first communication channel and a second communication channel having different operating ranges.

13. The method of claim 12, wherein the first communication channel uses at least one of a BLUETOOTH low energy (BLE), ultrasonic communication, visible light communication, and infrared communication; and the second communication channel uses at least one of wireless fidelity (WiFi) and BLUETOOTH (BT).

14. The electronic device of claim 11, wherein the controller is further configured to determine the lengths of the at least two partial keys based on capacities of the at least two communication channels, and to generate the at least two partial keys using bits of the determined lengths.

15. The electronic device of claim 11, wherein the counterpart device is configured to transmit the at least two partial keys divided from the second public key in response to the at least two partial keys transmitted from the first device.

16. An electronic device supporting communication between devices, the electronic device comprising:
a transceiver configured to establish at least two communication channels having different physical characteristics; and
a controller configured to execute an application for authentication of a counterpart device, to receive, from the first device, at least two partial keys divided from a first public key of the counterpart device through the at least two communication channels, to generate a second public key of the electronic device based on the at least two partial keys divided from the first public key, to transmit, to the first device, at least two partial keys divided from the second public key through at least one of the at least two communication channels, and to perform secure communication with the counterpart device using a shared key generated based on the at least two partial keys divided from the first public key,
wherein the at least two partial keys divided from the second public key comprise lengths that are equal to lengths of the at least two partial keys divided from the first public key.

17. The electronic device of claim 16, wherein the at least two communication channels comprise a first communication channel and a second communication channel having different operating ranges.

18. The method of claim 17, wherein the first communication channel uses at least one of a BLUETOOTH low energy (BLE), ultrasonic communication, visible light communication, and infrared communication; and the second communication channel uses at least one of wireless fidelity (WiFi) and BLUETOOTH (BT).

19. The electronic device of claim 16, wherein at least one of the at least two partial keys divided from the first public key has a length determined based on capacities of the at least two communication channels, and comprises some bits of the first public key.

20. The electronic device of claim 16, wherein the application is executed to transmit, by the counterpart device, the second public key in response to the at least two partial keys received from the first device.

* * * * *